United States Patent [19]

Tsukuno

[11] Patent Number: 5,212,274
[45] Date of Patent: May 18, 1993

[54] PROCESS FOR PREPARING HIGH MOLECULAR WEIGHT ORGANOPOLYSILOXANES

[75] Inventor: Akihito Tsukuno, Annaka, Japan

[73] Assignee: Shin-Etsu Chemical Co., Ltd., Tokyo, Japan

[21] Appl. No.: 842,632

[22] Filed: Feb. 27, 1992

[30] Foreign Application Priority Data

Feb. 27, 1991 [JP] Japan .................................. 3-055895

[51] Int. Cl.$^5$ ............................................ C08G 77/06
[52] U.S. Cl. ....................................... 528/14; 528/21; 528/23; 556/467
[58] Field of Search ............................ 528/14, 21, 23; 556/467

[56] References Cited

U.S. PATENT DOCUMENTS 2,883,366  4/1959  Kantor et al. .
4,008,261  2/1977  Brown et al. .
5,116,928  5/1992  Inomata et al. ...................... 528/23

FOREIGN PATENT DOCUMENTS 0255957  2/1988  European Pat. Off. .

Primary Examiner—Melvyn I. Marquis
Attorney, Agent, or Firm—Oblon, Spivak, McClelland, Maier & Neustadt

[57] ABSTRACT

A process for preparing a high molecular weight organopolysiloxane comprising: a first polymerization step of bringing a low molecular weight organopolysiloxane into reaction in the presence of a quaternary phosphonium hydroxide compound and/or a silanolate thereof as a catalyst under heating; and a second polymerization step for bringing the resulting reaction mixture into reaction in the presence of an alkali metal hydroxide and/or a silanolate thereof as a catalyst under heating. According to the process, a high molecular weight organopolysiloxane can be prepared using a reduced amount of catalyst for polymerization reaction, so that the amount of salts formed from a neutralizing agent is smaller and the subsequent filtration step for purification is less burdensome and easier to carry out. Further, it is possible to obtain high molecular weight organopolysiloxanes of excellent qualities as to transparency, electrical insulation property, arrangement of structural units in the case of preparation of copolymer, and odor.

7 Claims, No Drawings

PROCESS FOR PREPARING HIGH MOLECULAR WEIGHT ORGANOPOLYSILOXANES

BACKGROUND OF THE INVENTION

1. Field of the Invention

The present invention relates to a process for preparing a high molecular weight organopolysiloxane from a low molecular weight organopolysiloxane.

2. Description of the Prior Art

As a method of polymerizing a low molecular weight cyclic organopolysiloxane or a linear organopolysiloxane to produce a high molecular weight organopolysiloxane, the following processes are known:

(i) a process in which starting organopolysiloxanes are reacted under predetermined reaction conditions by use of an alkali metal hydroxide or silanolate thereof as a catalyst, then a neutralizing agent is added to the resulting reaction mixture to neutralize the catalyst, and low molecular weight polymers are removed [see J. Am. Chem. Soc., 76,249 (1954)];

(ii) a process in which starting organopolysiloxanes are subjected to polymerization at a comparatively low temperature by use of a quaternary phosphonium hydroxide or silanolate thereof as a catalyst, then temperature is raised followed by heating for a predetermined period to deactivate the catalyst, and low molecular weight polymers are removed [see J. Polymer Sci. 40, 35 (1959)]; and (iii) a process in which starting organopolysiloxanes are reacted under predetermined reaction conditions by use of a strong acid, e.g. sulfuric acid, as a catalyst, then the resulting reaction mixture is admixed with a neutralizing agent or washed with water to deactivate the catalyst, and low molecular weight polymers are removed [see D. F. Wilcock, Gen. Elec. Rev., 49, [No. 11], 14 (1946)].

The above three processes, however, have drawbacks as follows.

First, the process of (i) above uses a large amount of catalyst for reaction, resulting in the formation of a large amount of salts upon deactivation of the catalyst after the reaction. Therefore, a purification filtration step for removing the large amount of formed salts imposes a heavy burden on the production, in regard of equipment, labor, energy, time and cost.

The process of (ii), on the other hand, has the drawback that the high molecular weight organopolysiloxanes obtained are poor in electrical insulation property and have an odor. In addition, where a plurality of organopolysiloxanes are used as starting material in order to prepare a high-molecular copolymer, only those copolymers in which structural units are arranged in block form can be obtained; namely, it is difficult to obtain a copolymer in which structural units are arranged at random. Further, where an organopolysiloxane having an amino group, mercapto group or the like is used as at least part of the starting materials, equilibration reaction does not take place satisfactorily and the resulting high molecular weight product will take a milky color.

The process of (iii) above, if carried out by use of a neutralizing agent, requires a large amount of neutralizing agent, leading to formation of a large amount of salts and to a great processing burden imposed by a purification filtration step for removal of the salts, as in the process of (i). Where the process of (iii) is carried out in the mode of washing the reaction mixture with water, there arise the problems of complicated production steps, low yield, and a heavy burden with respect to equipment, labor, energy, cost, etc. imposed by a treatment step needed for disposal of large amounts of waste water.

SUMMARY OF THE INVENTION

It is accordingly an object of the present invention to provide a process by which high molecular weight organopolysiloxanes of good quality can be obtained with less burden of a purification filtration step after polymerization.

In order to attain the above object, the present invention provides a process for preparing a high molecular weight organopolysiloxane comprising:

the first polymerization step of bringing a low molecular weight organopolysiloxane into reaction in the presence of a quaternary phosphonium hydroxide compound as a catalyst under heating; and the second polymerization step of bringing the resulting reaction mixture into reaction in the presence of at least one member selected from the group consisting of alkali metal hydroxides and silanolates thereof as a catalyst under heating.

Namely, according to the present invention, first-step polymerization is carried out by using a quaternary phosphonium hydroxide compound and, subsequently, second-step polymerization is carried out by use of an alkali metal hydroxide and/or a silanolate thereof, to thereby produce the desired high molecular weight organopolysiloxane.

According to the process of the present invention, high molecular weight organopolysiloxanes can be prepared using a small amount of catalyst for polymerization reaction, so that the amount of salts formed upon addition of a neutralizing agent is small and the subsequent purification filtration step is less burdensome and easy to carry out. Further, it is possible to obtain high molecular weight organopolysiloxanes of excellent qualities as to transparency, electrical insulation property, arrangement of structural units in the case of preparation of copolymer, and odor.

DETAILED DESCRIPTION OF THE INVENTION

STARTING MATERIAL

The low molecular weight organopolysiloxane for use as starting material in the present invention is one which has a polymerization degree of generally from 2 to about 1,000, preferably from 2 to 20. The polymerization degree herein corresponds to the number of silicon atoms contained in one molecule of the organopolysiloxane. The low molecular weight organopolysiloxane may be cyclic or linear, or may be a mixture of cyclic and linear organopolysiloxanes.

The cyclic low molecular weight organopolysiloxanes include, for example, organopolysiloxanes having the following general formula [I]:

$$[(R^1)_2SiO]_m \qquad [I]$$

wherein $R^1$ may be the same or different and each are a substituted or unsubstituted monovalent hydrocarbon group of from 1 to 8 carbon atoms, for example, alkyl groups such as methyl, ethyl, propyl, etc.; cycloalkyl groups such as cyclohexyl, cyclopentyl, etc.; alkenyl groups such as vinyl, allyl, etc.; aryl groups such as phenyl, diphenyl, etc.; alkaryl groups such as tolyl, xylyl, etc.; aralkyl groups such as benzyl, phenylethyl, etc.; halogenated alkyl groups such as 3,3,3-trifluoropropyl, 4-chlorobutyl, etc.; and halogenated aryl groups such as chlorophenyl, dibromophenyl, etc., and m is an integer of from 3 to 20.

The linear low molecular weight organopolysiloxanes for use as starting material include, for example, organopolysiloxanes having the following general formula [II]:

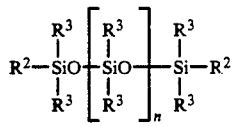

wherein $R^2$ may be the same or different and each are an unsubstituted or substituted monovalent hydrocarbon group of from 1 to 8 carbon atoms, for example, the groups exemplified for the $R^1$ above, in which at least part of the hydrogen atoms may be replaced by amino group or mercapto group, $R^3$ may be the same or different and each are at least one member selected from the group consisting of unsubstituted or substituted monovalent hydrocarbon groups of from 1 to 8 carbon atoms, hydroxyl group and alkoxyl groups, and n is an integer of from 0 to 1000.

For the above $R^3$, the suitable monovalent hydrocarbon groups include, for example, those groups mentioned above as exemplars of $R^1$, and the suitable alkoxyl groups include, for example, methoxyl, ethoxyl, isopropoxyl, and so on.

In the present invention, at least one of the above low molecular weight organopolysiloxanes is used as starting material.

FIRST POLYMERIZATION STEP

According to the present invention, a quaternary phosphonium hydroxide compound is used as a catalyst to polymerize the above low molecular weight organopolysiloxane.

The quaternary phosphonium hydroxide compounds include, for example, quaternary phosphonium hydroxides having the following general formula [III]:

$$(R^4)_4POH \qquad [III]$$

wherein $R^4$ may be the same or different from each other and each are a monovalent organic group of from 1 to 8 carbon atoms, or silanolates thereof. Such quaternary phosphonium hydroxides or silanolates thereof may be used either singly or in combination of two or more.

Exemplars of the above $R^4$ include alkyl, cycloalkyl, aryl, alkaryl and aralkyl groups, of which preferred are, for example, methyl, methyltriphenyl, ethyl, n-butyl and n-butyltricyclohexyl groups.

Among the quaternary phosphonium hydroxide compounds for use in the present invention, particularly preferred are tetramethylphosphoniumhydroxide, tetraethylphosphonium hydroxide, tetra n-butylphosphonium hydroxide and silanolates thereof. The quaternary phosphonium hydroxide compound is ordinarily used in an amount of 5.0 ppm or above, preferably from 50 to 500 ppm, more preferably from 100 to 300 ppm, based on the low molecular weight organopolysiloxane used as starting material.

The polymerization reaction is generally carried out in an inert gas atmosphere, such as nitrogen, at a temperature of from 100° to 120° C. It is preferable that the polymerization reaction is carried out until a polymer having a polymerization degree of from 80 to 100% based on the final polymerization degree of the high-molecular polymer intended is obtained. The polymerization duration, which depends on the polymerization temperature, may generally range from about 10 to about 120 minutes.

SECOND POLYMERIZATION STEP

According to the present invention, the first-step polymerization as above is followed by second-step polymerization which is carried out using at least one member selected from the group consisting of alkali metal hydroxides and silanolates thereof as a catalyst.

The alkali metal hydroxides include, for example, CsOH, RbOH, KOH, NaOH. In the present invention, siliconate of KOH is particularly preferable for use as catalyst. These catalysts are used preferably in an amount, in terms of alkali metal hydroxide, of 50 ppm or below, more preferably from 1 to 20 ppm, based on the low molecular weight organopolysiloxane used as starting material. This catalyst amount is from 1/100 to  the amount of catalyst which would be needed in the case of preparing the desired high polymeric product directly by the second-step polymerization without performing the first-step polymerization. The reduced catalyst amount is a major advantage of the present invention. Namely, according to the present invention it is possible, by carrying out polymerization in two steps as above, to reduce markedly the amount of the alkali metal hydroxide to be used as a catalyst. Accordingly, the amount of salts formed upon deactivation cf the catalyst is also reduced greatly, and the burden of the subsequent purification filtration step is alleviated greatly.

The second-step polymerization is preferably carried out at a temperature of from 50° to 300° C., more preferably from 150° to 300° C. The higher the reaction temperature, the shorter is the reaction time needed to obtain the desired high molecular weight organopolysiloxane. If the temperature is excessively high, however, the concentration of low molecular weight polymers will be higher in the gaseous phase and lower in the liquid reaction system, resulting in a lower yield. If the reaction temperature is too low, on the other hand, the polymerization may proceed insufficiently or take a long time to be completed.

The second-step polymerization is in general carried out until the reaction reaches equilibrium. The duration of polymerization may ordinarily be from 10 minutes to 10 hours, or from 10 minutes to about 2 hours.

Upon completion of the second-step polymerization step, a high molecular weight organopolysiloxane having a polymerization degree which, though dependent on the polymerization degree of the low molecular weight organopolysiloxane used as the starting material, is greater than the polymerization degree of the starting organopolysiloxane and is 11 or above, typically from 50 to 10000, is obtained.

The desired polymerization degree may be attained upon the completion of the first polymerization step, but the arrangement of the siloxane units may be low in uniformity. Such an ununiform arrangement can be made uniform through the second polymerization step.

AFTER-TREATMENT STEP

After the second-step polymerization is completed, a neutralizing agent is added to the reaction mixture to deactivate the catalyst. Then, stripping of low molecular weight polymers is carried out, as usual, followed by filtration for purifying the desired organopolysiloxane product.

The neutralizing agents suitable for this use include, for example, tricresyl phosphate, trimethylchlorosilane, ethylene chlorohydrin, etc., of which preferred is ethylene chlorohydrin.

The removal of low molecular weight polymers is ordinarily carried out by stripping under reduced pressure, in the same manner as in conventional practice.

Because salts are formed through the neutralization step, purification filtration is carried out to remove the salts. The purification filtration is normally carried out by use of a filter such as wire mesh, cartridge filter, filter press, etc.

Use

The high molecular weight organopolysiloxanes obtained according to the present invention are of high quality and are suited to use as, for examples, materials for producing release papers, cosmetics, fiber-treating agents, resin improvers, and silicone rubbers to be employed where electrical insulation properties are needed, such as at portions of various electronic or electrical parts.

EXAMPLES

The present invention will now be described by the following nonlimitative examples.

Example 1

A reaction vessel was charged with 800 kg of octamethyltetracyclosiloxane and 40 kg of a dimethylpolysiloxane of the formula:

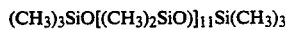

(CH$_3$)$_3$SiO[(CH$_3$)$_2$SiO]$_{11}$Si(CH$_3$)$_3$ having a viscosity of 10 cSt (25° C.), followed by mixing. The reaction vessel was purged with nitrogen gas at a flow rate of 2 Nm$^3$/hr for 30 minutes while maintaining the internal temperature in the range from 105° to 115° C., to remove dissolved gases from the reaction system. Next, a silanolate of (n-C$_4$H$_9$)$_4$POH was added to the mixture in the reaction vessel in an amount of 300 ppm, in terms of (n-C$_4$H$_9$)$_4$POH, and polymerization was carried out at a temperature of from 105° to 115° C. for 2 hours. To the resulting reaction mixture, a silanolate of KOH was added as a catalyst in an amount of 20 ppm (in terms of KOH), followed again by polymerization at from 150° to 160° C. for 3 hours. After the reaction was over, neutralization for deactivating the silanolate of KOH was carried out by adding ethylene chlorohydrin as a neutralizing agent in an amount of 73 g, the amount being three times the theoretical amount equivalent to the silanolate of KOH used. Then, vacuum stripping was carried out under the conditions of 300° C. and from 1 to 5 mmHg for 3 hours, to remove low molecular weight organopolysiloxanes, and purification filtration was carried out by a filter press at a filtering pressure of 2 kg/cm$^2$ for 1 hour, to obtain a colorless, transparent, odorless high molecular weight dimethylpolysiloxane (yield: 86%).

The dimethylpolysiloxane thus obtained was measured for physical properties, and found to have a viscosity at 25° C. of 1206 cSt (corresponding to a polymerization degree of about 300) and a volatile content of 0.1% as measured by heating at 150° C. for 24 hours. Measurements of electrical properties revealed the dimethylpolysiloxane as having a volume resistivity of 6.2×10$^{15}$ Ω/cm as well as a dielectric constant of 2.74 and a dielectric loss tangent of 1.0×10$^{-5}$, at 50 Hz.

Example 2

The procedure of Example 1 was repeated, except that 930 kg of octamethyltetracyclosiloxane, 21 kg of a dimethylpolysiloxane of the formula:

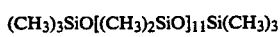

(CH$_3$)$_3$SiO[(CH$_3$)$_2$SiO]$_{11}$Si(CH$_3$)$_3$ and 30 kg of 3-aminopropylmethylpolysiloxane of the formula:

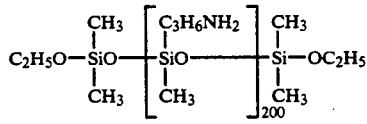

$$C_2H_5O-\underset{\underset{CH_3}{|}}{\overset{\overset{CH_3}{|}}{Si}}O\left[\underset{\underset{CH_3}{|}}{\overset{\overset{C_3H_6NH_2}{|}}{Si}}O\right]\underset{\underset{CH_3}{|}}{\overset{\overset{CH_3}{|}}{Si}}-OC_2H_5$$
(subscript 200 on bracket)

were used, and vacuum stripping was carried out under the conditions of 150° C. and from 1 to 5 mmHg for 2 hours, to obtain a colorless, transparent, amino group-containing high molecular weight organopolysiloxane (yield: 88%).

The amino group-containing organopolysiloxane thus obtained was measured for physical properties, and found to have a viscosity at 25° C. of 4,100 cSt (corresponding to a polymerization degree of about 600), a volatile content of 3.2% as measured by heating at 105° C. for 3 hours, and an amine equivalent of 3,370 g/mol.

Further, in order to evaluate the dispersion quality of amino group-containing siloxane units in the amino group-containing organopolysiloxane, the random polymer content of the organopolysiloxane was measured to be 40%.

Measurement of random polymer content was made as follows.

The arrangement of structural units in the molecules of the organopolysiloxane obtained was analyzed by use of $^{29}$Si-NMR, to determine the amount of random polymers and the amount of block polymers, and the random polymer content was calculated from the following formula:

$$\text{Random polymer content (\%)} = \frac{\text{amount of random polymers} \times 100}{\text{(amount of random polymers) + (amount of block polymers)}}$$

The arrangement of structural units in the random polymers is represented by -A-B-A-, and that in the block polymers by -B-B- or -A-A-, where A is a dimethylsiloxy unit and B is a N-containing siloxy unit.

Comparative Example 1

The procedure of Example 1 was repeated except that the polymerization step using an alkali metal hydroxide and/or a silanolate thereof as a catalyst was omitted and a neutralization step for deactivation of catalyst was carried out by heating at an internal temperature of from 150° to 160° C. for 4 hours, to obtain a high molecular weight dimethylpolysiloxane (yield: 86%).

The high-molecular weight dimethylpolysiloxane thus obtained was measured for electrical properties, and found to have a volume resistivity of $2.9 \times 10^{13}$ $\Omega$/cm as well as a dielectric constant of 2.76 and a dielectric loss tangent of $2.1 \times 10^{-4}$, at 50 Hz. Besides, the dimetylpolysiloxane obtained had an offensive odor.

Comparative Example 2

The procedure of Example 2 was repeated except that the polymerization step using an alkali metal hydroxide and/or a silanolate thereof as a catalyst was omitted and a neutralization step for deactivation of catalyst was carried out by heating at an internal temperature of 150° to 160° C. for 4 hours, to obtain an amino group-containing organopolysiloxane (yield: 88%).

The amino group-containing organopolysiloxane thus obtained had an amine equivalent of 3400 g/mol and a random polymer content of 0%, and had a milky color.

Comparative Example 3

Charging of starting material and purging with an inert gas were carried out in the same manner as in Example 1. The polymerization step by use of a quaternary phosphonium hydroxide compound and/or a silanolate thereof as a catalyst was omitted, and the polymerization step by use of an alkali metal hydroxide and/or a silanolate thereof as a catalyst was carried out by adding a silanolate of KOH to the reaction mixture in an amount of 200 ppm (in terms of KOH) and carrying out polymerization at from 150° to 160° C. for 8 hours. After the polymerization was over, the same neutralizing agent as that used in Example 1 was added in an amount of three times the theoretical amount equivalent to the KOH catalyst, thereby neutralizing and deactivating the catalyst. Subsequently, a stripping step and a purification filtration step were carried out in the same manner as in Example 1, to obtain a high molecular weight dimethylpolysiloxane (yield: 80%). It took 8 hours to complete the purification filtration step.

We claim:

1. A process for preparing a high molecular weight organopolysiloxane comprising:
   a first step of polymerizing a low molecular weight organopolysiloxane having a polymerization degree of from 2 to about 1,000 by heating in the presence of a quaternary phosphonium hydroxide compound or a silanolate of said quaternary phosphonium hydroxide compound as a catalyst; followed by
   a second step of polymerizing the resulting reaction mixture by heating in the presence of at least one member selected from the group consisting of alkali metal hydroxides and silanolates thereof as a catalyst to obtain a higher molecular weight organopolysiloxane.

2. The process according to claim 1, wherein the first-step polymerization is carried out to an extent such that an organopolysiloxane having a polymerization degree of at least 80% based on the final polymerization degree of the high molecular weight organopolysiloxane desired is formed.

3. The process according to claim 1, wherein the quaternary phosphonium hydroxide compound or a silanolate of said quaternary phosphonium hydroxide compound comprises a quaternary phosphonium hydroxide having the following formula:

$(R^4)_4POH$ wherein $R^4$ may be the same or different and each are an organic group of from 1 to 8 carbon atoms or a silanolate of said said quaternary phosphonium hydroxide.

4. The process according to clam 1, wherein the quaternary phosphonium hydroxide compound or silanolate thereof is present in an amount of at least 5.0 ppm based on the low molecular weight organopolysiloxane.

5. The process according to claim 1, wherein the first-step polymerization is carried out in an inert gas atmosphere at a temperature of from 100° to 200° C.

6. The process according to claim 1, wherein the catalyst present in the second-step polymerization is at least one compound selected from the group consisting of CsOH, RbOH, KOH, NaOH and silanolates thereof.

7. The process according to claim 1, wherein the catalyst for the second-step polymerization is present in an amount of up to 50 ppm, in terms of alkali metal hydroxide, based on the low molecular weight organopolysiloxane.

* * * * *